United States Patent [19]

Dean, IV

[11] 3,953,824

[45] Apr. 27, 1976

[54] DEPTH SOUNDER WITH INDICIA LIGHTING MEANS

[76] Inventor: Leonard Y. Dean, IV, 320 Azalea Drive, Eufaula, Ala. 35901

[22] Filed: Oct. 21, 1974

[21] Appl. No.: 516,169

[52] U.S. Cl. .......................... 340/3 C; 340/366 D; 340/373
[51] Int. Cl.² ...................... G01S 9/68; G01S 7/56
[58] Field of Search ............... 340/3 C, 366 D, 373

[56] References Cited
UNITED STATES PATENTS

| | | | |
|---|---|---|---|
| 2,750,574 | 6/1956 | Fryklund | 340/3 C |
| 2,767,385 | 10/1956 | Smith | 340/3 C |
| 3,146,440 | 8/1964 | Emerson | 340/373 |
| 3,267,413 | 8/1966 | Beebe et al. | 340/3 C |

*Primary Examiner*—Richard A. Farley
*Attorney, Agent, or Firm*—Jones, Thomas & Askew

[57] ABSTRACT

A depth sounder having a dial that includes a viewing area, a plurality of indicia surrounding the viewing area, and a flasher that sweeps the viewing area and flashes adjacent to an indicium to indicate the depth sounded, the dial being generally opaque with transparent or translucent indicia so that light from the flasher will illuminate at least some of the indicia in the vicinity of the indicium indicating the depth sounded.

5 Claims, 3 Drawing Figures

DEPTH SOUNDER WITH INDICIA LIGHTING MEANS

This invention relates to depth sounders and the like, and is more particularly concerned with a depth sounder having indicia lighting means.

Depth sounders are well known in the art, and comprise generally a rotating light, or flasher, adjacent to a dial. Means are provided for propagating a signal into water and for receiving an echo signal. The flasher is caused to be lighted at the time a signal is propagated, and is again caused to be lighted when an echo signal is received. Each time the flasher is lighted, the flasher is adjacent to an appropriate indicium on the dial, the appropriate indicium being zero when the signal is propagated, and a number indicating the depth when the echo signal is received.

While depth sounders are commonly utilized, and have achieved wide acceptance, there is an outstanding difficulty with prior art depth sounders in that the dial is very difficult to read at night. Previous attempts to overcome this difficulty have included simply memorizing the dial so that one can read the flashes as one reads a clock: simply knowing where the various numbers are located on the dial. Such a procedure could be hazardous, however, if a person uses different depth sounders having different dials. Another prior art solution to the problem is the obvious one of providing an external light to illuminate the dial. This solution is undesirable in that two or more lights will generally be necessary to provide uniform illumination of the dial, in addition to the fact that the additional lights and an associated switch will considerably increase the cost of the depth sounder.

The present invention overcomes the abovementioned and other difficulties with the prior art depth sounders by providing a dial for a depth sounder in which the indicia are illuminable from behind the dial. A flasher is utilized that has sufficient intensity to provide both the usual indication and illumination of at least some of the indicia on the dial. Thus, the present invention provides a very efficient and inexpensive means to illuminate at least the appropriate indicia on a dial, and it is possible that substantially the entire face of the dial would be lighted.

These and other features and advantages of the present invention will become apparent from consideration of the following specification when taken in conjunction with the accompanying drawings in which.

Figure 1:
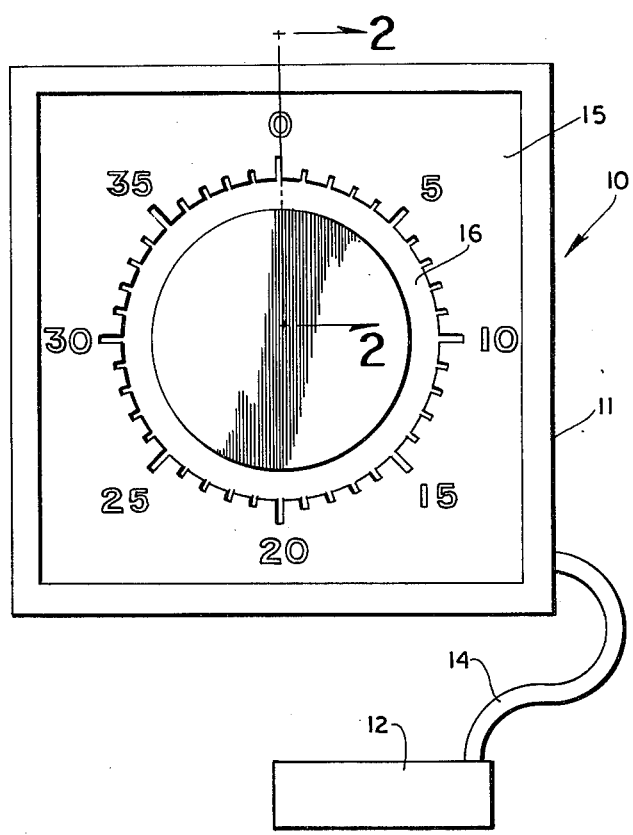
FIG. 1 is a front elevational view of a depth sounder made in accordance with the present invention and having the transducer schematically represented.

Referring now more particularly to the drawings and to that embodiment of the invention here chosen by way of illustration, the depth sounder illustrated in FIG. 1 is generally designated at 10 and comprises the housing 11 connected to a transducer 12 by a cord 14. Those skilled in the art will realize that the housing 11 includes means for generating a signal that is passed through the cord 14 to the transducer 12, from which a signal is propagated. When the propagated signal engages something relatively solid, an echo signal will be returned to the transducer 12, passed through the cord 14 and to the housing 11. One of the principal objects is for the propagated signal to engage the bottom of the body of water; however, the signal will also echo off fish, tree limbs and other objects in the water, and an echo signal will be returned to the transducer for each object the propagated signal encounters.

When an echo signal is received by the transducer the returned signal is utilized by appropriate means within the housing 11 to cause a flasher to flash. Thus, the flasher is arranged to flash when the signal is propagated, the flasher being located at the zero indicium, and the flasher will flash again each time an echo signal is received, the flasher being located at an indicium indicative of the depth of the object from which the echo signal was returned.

Conventionally depth sounders, such as the depth sounder 10, include a dial face 15 having numerals or other indicia and a viewing area 16 through which light from a flasher can be seen. Conventionally, however, the dial face 15 is opaque with raised indicia.

Figure 2:
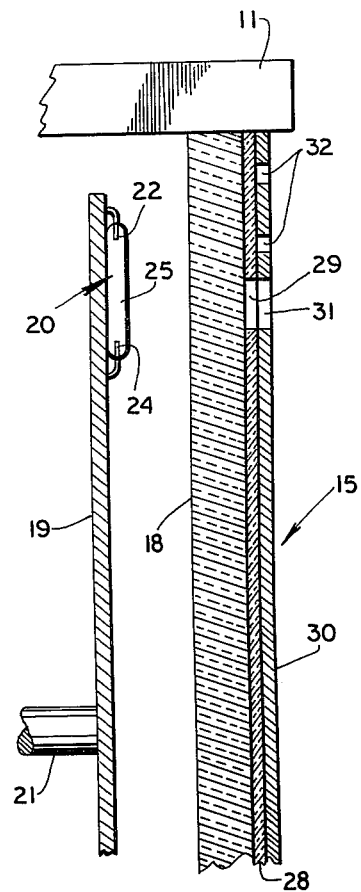
FIG. 2 is an enlarged cross-sectional view taken substantially along the line 2—2 in FIG. 1 showing the dial face and the flasher; and, FIG. 3 is a partial exploded view showing the construction of the face of a dial for use in a depth sounder made in accordance with the present invention.
Figure 3:
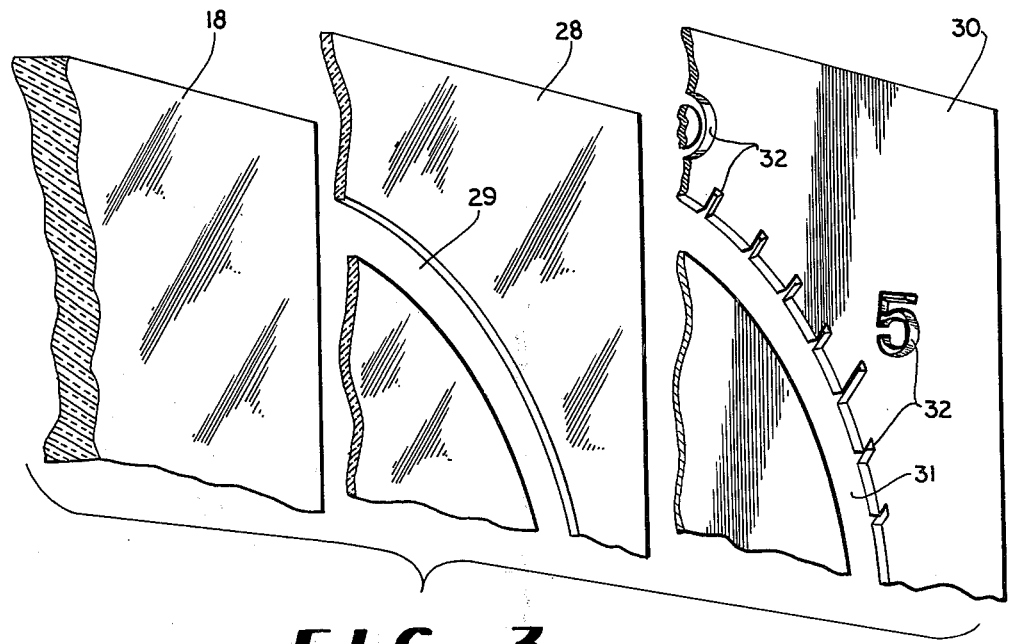

Looking at FIG. 2 of the drawings, the present invention includes a front wall 18 of the housing 11, the front wall 18 being substantially transparent. In one successful embodiment of the invention the front wall 18 is formed of a sheet of methyl methacrylate, though it will be obvious to those skilled in the art that other materials could be used since the object is to provide a substantially transparent wall. Rearwardly of the wall 18, disposed within the housing 11, there is a rotatable disk 19 carrying a flasher 20. The disk 19 is here shown as supported by a shaft 21.

The flasher 20 is normally an electric lamp of the electrical discharge type; and, while the present invention contemplates use of the same type of lamp, the present invention preferably utilizes a lamp of higher power than is conventionally used in depth sounders. More specifically, the flasher 20 should preferably have the electrodes 22 and 24 located at opposite ends of a glass envelope 25, thereby requiring a relatively high voltage for operation of the lamp. The lamp used in one successful embodiment of the invention has a minimum operating voltage of 900 volts, and is operated at about 1400 volts. None of these technical details is in itself critical, it being important only to be sure that the flasher 20 has sufficient light output to illuminate the dial face as will be discussed in detail hereinafter.

The outer surface of the wall 18 carries a first coating 28 that is coextensive with the wall 18; but, the coating 28 has an opening 29 therein coextensive with the viewing area 16. The coating 28 is a translucent material having for its object dispersion of the light emitted by the flasher 20. Other means could be provided to achieve the dispersion of the light, but the coating 28 is conveniently provided by means of a translucent paint applied directly to the wall 18. Such a coating achieves the desired result quite inexpensively and conveniently.

Superposed on the coating 28, there is an outer opaque coating 30. The coating 30 has an opening 31 therein coextensive with, and aligned with, the opening 29 in the coating 28. These aligned openings 29 and 31 provide the viewing area 16 for the conventionally provided signal. The coating 30 is further provided with apertures, such as the apertures 32, constituting the indicia for the dial of the depth sounder. Thus, the coating 30 is substantially opaque and defines openings therein through which light from the flasher 20 can be seen, some of those openings defining indicia for the depth sounder dial.

In view of the foregoing, it should now be understood that the present invention provides a depth sounder having a substantially transparent wall 18 behind which is mounted the flasher 20. When the flasher 20 emits light, light will pass through the wall 18 and to a diffusing material 28 so that an area of the dial in the vicinity of the flasher 20 will be illuminated. When the echo signal is returned from a relatively small object such as a fish or a tree limb or the like, the duration of the flash will be relatively short, perhaps about 100 to 150 micro-seconds. This will produce a small quantity of light so that a relatively small portion of the dial will be illuminated; however, even for the very brief duration of flash approximately 25% of the dial may be illuminated. When the echo signal is returned from the bottom of the body of water, the duration of the flash will be relatively long, perhaps about 600 micro-seconds. This will produce a greater quantity of light that will be sufficient to illuminate at least half the dial, and perhaps even a greater percentage depending on the particular design of the depth sounder.

By way of example, for a depth sounder having a 100 foot scale, when the signal is propagated the flasher will be adjacent to the zero inidicium and will emit sufficient light to illuminate approximately half the dial or more. If the bottom is 50 feet away, the flasher will have a long-duration flash when the flasher is adjacent to the 50 indicium, and this will light the lower half of the dial. Since there would be a time lapse of approximately 0.02 second, the entire dial face would be illuminated. Additionally, there may be numerous flashes of shorter duration between the 0 and the 50 so that the dial would be well illuminated and quite easy to read. Of course, with a sufficiently bright flasher 20 and an efficient coating 28, substantially the entire dial face 15 may be illuminated each time the flasher 20 flashes.

While many modifications may be made in the embodiment of the invention herein illustrated, it should be understood that a translucent, or diffusing, means such as the coating 28 is required to cause the light emitted by the flasher 20 to illuminate the dial face 15. The embodiment here presented includes a substantially complete coating 28 partially blocked out by the opaque coating 30; however, it should be understood that the opaque coating 30 could be omitted and the indicia 32 formed by the coating 28. In such an embodiment, the translucent paint would be applied to the wall 18 in the form of numerals or other desired indicia so that only the indicia would be effectively illuminated by the light from the flasher 20.

These and other modifications may be made in the embodiment of the invention here presented by way of illustration, and the full use of equivalents may be resorted to without departing from the spirit or scope of the invention as defined by the appended claims.

I claim:

1. A depth sounder having a dial face, a plurality of indicia on said dial face, a flasher rearwardly of said dial face, said flasher being constructed and arranged to sweep past said plurality of indicia, and means for causing said flasher to flash, a viewing area defined by said dial face through which said flasher can be observed, said viewing area being adjacent to said plurality of indicia, said plurality of indicia comprising light diffusing means, the arrangement being such that when said flasher is caused to flash said light diffusing means will receive light from said flasher to cause illumination of at least some of said plurality of indicia.

2. A depth sounder as claimed in claim 1, said light diffusing means comprising translucent paint on said dial face.

3. A depth sounder as claimed in claim 2, said light diffusing means being substantially coextensive with said dial face, and including a generally opaque coating superposed on said dial face, said generally opaque coating defining a plurality of apertures therein, said plurality of apertures constituting said plurality of indicia.

4. A depth sounder as claimed in claim 1, said dial face comprising a wall of transparent material, said light diffusing means comprising a first coating of translucent material carried by said wall of transparent material, said first coating defining an opening therein coextensive with said viewing area, second coating of opaque material carried by said first coating, said second coating defining an opening therein coextensive with said viewing area, said second coating defining a plurality of apertures therein for forming said plurality of indicia.

5. A depth sounder as claimed in claim 1, wherein said at least some of said plurality of indicia comprises at least 25 percent of said plurality of indicia.

* * * * *